UNITED STATES PATENT OFFICE.

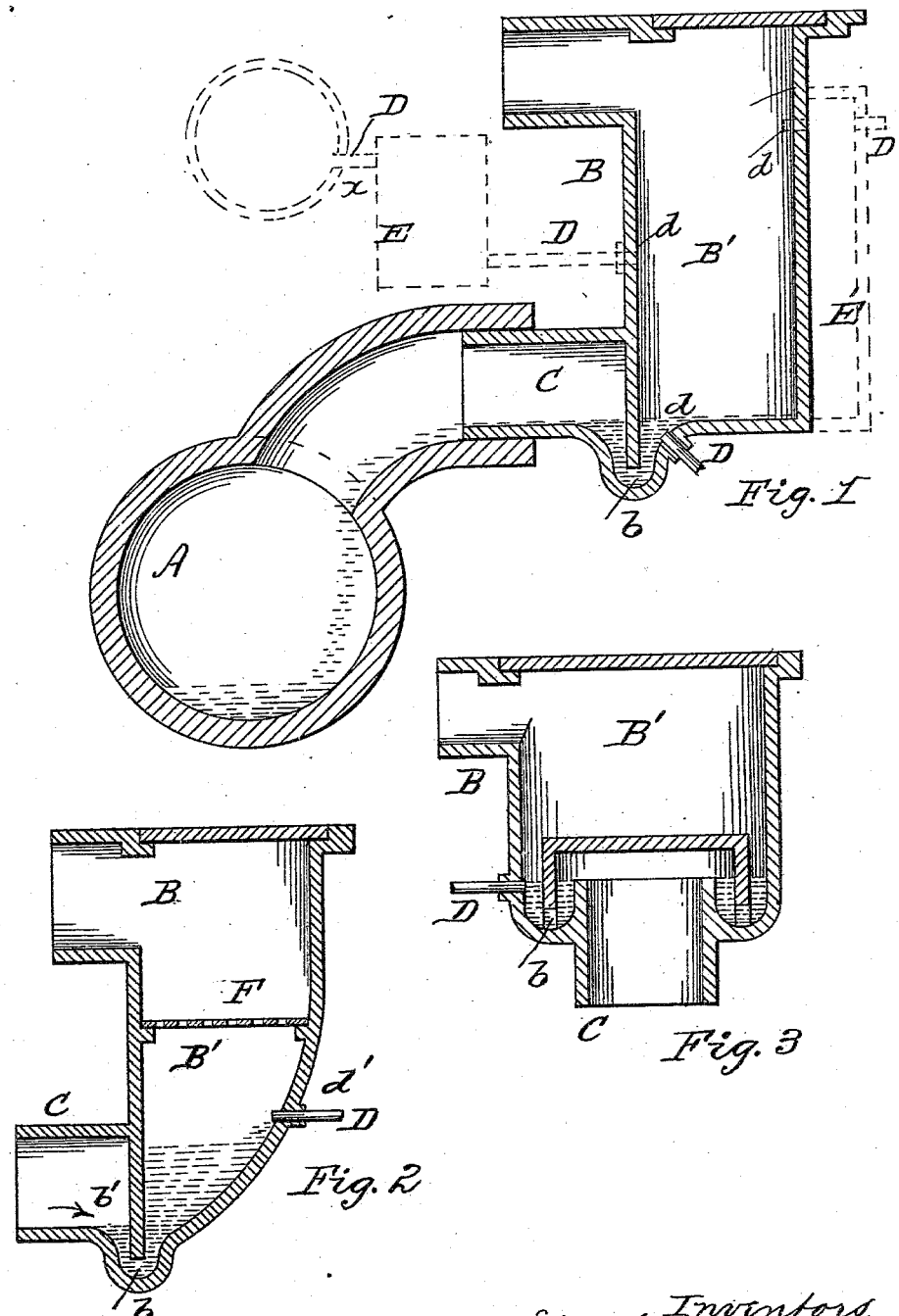

EDWARD Z. COLLINGS, OF CAMDEN, NEW JERSEY, AND CHARLES F. PIKE, OF PHILADELPHIA, PENNSYLVANIA.

SEWER-INLET.

SPECIFICATION forming part of Letters Patent No. 274,466, dated March 27, 1883.

Application filed August 10, 1882. (No model.)

*To all whom it may concern:*

Be it known that we, EDWARD Z. COLLINGS, of Camden, in the county of Camden and State of New Jersey, and CHARLES F. PIKE, of Philadelphia, in the county of Philadelphia and State of Pennsylvania, have invented certain new and useful Improvements in Sewer-Inlets, of which the following is a specification, reference being had therein to the accompanying drawings, wherein—

Figure 1 is a transverse section of a sewer and inlet embodying our invention. Fig. 2 is a like view of inlet, illustrating the manner in which the running-water or fluid seal equalizes the back-pressure in the sewer; and Fig. 3 is a similar view of a modified form of trap for the sewer-inlet.

Our invention has relation to sewer-inlets, and has for its object to prevent sewer-gas passing through or escaping from the same to pollute the atmosphere in the neighborhood of such devices. Sewer-inlets as heretofore and at present constructed have only an ordinary goose-neck partition or other trap for barring the passage of the sewer-gas therethrough; but owing to various causes such construction fails to effect the result desired and the sewer-gas escapes from such inlets and contaminates the surrounding atmosphere to cause it to become extremely deleterious and prejudicial to the public health. Especially noticeable is this escape of sewer-gas at different periods of the day, caused by the undue pressure of gas in the sewer, which is produced by the rise of the tide in the sewers above the mouth or outlet of the sewers.

Our improved sewer-inlet is so constructed and arranged that such pressure in the sewers cannot exert sufficient force upon the sealing fluid or water in the trap to raise such water out of and unseal said trap to open a passage-way through it and the inlet for the escape of the gas. On the contrary, our improved inlet is so arranged that the sealing fluid or water in the trap always balances the pressure of the gas in the sewer, thereby preventing such pressure unsealing the trap. Consequently the sealing water or fluid therefor always maintains itself in its normal position to effect the seal for the trap, and the latter is always closed or sealed and no sewer-gas escapes therethrough to the inlet. Again, the supply of sealing-water for the traps of sewer-inlets is obtained or depends on the waste water or rain flowing thereinto from the gutters or other conveyers employed to conduct the drainage thereto. Such supply is not constant, but is intermittent only, at intervals of shorter or longer duration. Hence the water in the inlet-trap soon becomes saturated with sewer-gas, and in such state it permits the gas to pass freely through the trap and escape from the inlet.

In our improved inlet the water-supply for the trap does not depend upon the drainage, but has a fixed and positive source of supply, which is constantly flowing to the trap to form a running seal therefor. The water in the trap being thus continually renewed, it remains in a fresh condition. Hence it never reaches its point of sewer-gas saturation. Consequently as fast as such gas seeks to pass through such water it is absorbed thereby and carried off to the sewer. The provision of such running seal, therefore, offers a complete bar to the passage of sewer-gas through the trap and inlet, and it constitutes the primary feature of our invention.

Our improvement further consists in the novel combination, construction, and arrangement of parts, as hereinafter specifically described and claimed.

Referring to the accompanying drawings, A represents a sewer, B the inlet, and C the connection or conduit between said parts. The inlet B is of the usual or other appropriate and desired form, having a trap, $b$.

D represents a pipe designed and adapted to connect with the water-main, or a branch thereof, as shown at $x$, Fig. 1, and, if desired, may be furnished with a cock or valve so arranged that a flow of water will always be passing through pipe D to form a continuously-running seal for the trap of the inlet. Said pipe D may be connected to the inlet at $d$, as shown in Fig. 1, or at $d'$, as represented in Fig. 2, or it may be connected thereto at any other suitable or desired point.

The operation is as follows: The water from pipe D, constantly flowing into trap $b$, provides for a running-water seal therefor, so that said trap is always maintained in a sealed condition to bar the escape of sewer-gas therethrough. If at any time said trap should be siphoned, the water from pipe D soon seals and restores it to its normal state. When the mouth of the sewer A is closed by the rising of the tide in the river and the pressure of gas in the sewer exerts a force on the water in trap $b$ to cause it to rise in the chamber B′ of said inlet, the continued supply from pipe D, flowing into chamber B′, provides a fluid column which balances or equalizes such pressure, and the latter therefore does not unseal the trap $b$, but only exerts a graduallyincreasing pressure on the side $b'$ of said trap, while the gradually-increasing height of water or fluid collecting in chamber B′ provides a hydrostatic pressure on the opposite side of said trap, the consequence of which is that the pressure of the gas is equalized by the weight of the fluid-column in chamber B′, and the trap $b$ therefore remains in its sealed condition, and no sewer-gas can pass therethrough when subjected to pressure of gas in the sewer. Such action of the running-water seal is illustrated in Fig. 2, wherein the arrow represents the sewer-gas exerting a pressure on the water in trap $b$, while water from the pipe D, flowing into chamber B′, provides for the column of fluid in said chamber to form the necessary balance for such gas-pressure. Again, the water in trap $b$ being constantly renewed, it remains in a comparatively freshened or pure condition to permit it to absorb the gas or other odors contacting or commingling therewith, and when so absorbed are carried to the sewer by said water; hence the latter never reaches its point of gas-saturation. It is apparent, therefore, that our improved inlet is so constructed and arranged that no sewer-gas can pass therethrough, nor will such gas escape thereinto even when there is considerable back-pressure of the same in the sewer.

The pipe D may be of any suitable bore, its size depending upon the volume of water designed to be passed to the trap $b$. If desired, said pipe may be provided with a cock to regulate the supply of water passing to the inlet. So, too, if desired, a reservoir, E, for holding a disinfectant may be arranged in the path or line of said pipe, as shown at $x$, Fig. 1, or a pocket, E′, Fig. 1, may be secured to or formed on the inlet B, for holding such disinfectant, and the pipe D connected thereto, as shown, so that the water passing through said pipe will dissolve a portion of such disinfectant and carry it to the chamber B′, trap $b$, and sewer to disinfect said parts. We do not herein claim such disinfecting appliances, as we have made them the subject of a separate application of even date herewith.

Fig. 4 represents a modified form of trap for the inlet, having a circular cap or inverted cup arranged as shown.

If desired, a screen, F, (shown in Fig. 2,) may be employed to prevent any coarse particles of dirt, garbage, or other material passing to trap $b$ to clog the same.

What we claim as our invention is—

1. A sewer-inlet provided with a trap and a pipe leading to a water-main or other constant source of supply, whereby a continuous flow of water is passed to the trap of the inlet, as and for the purpose set forth.

2. In preventing the displacement of the sealing-water in sewer-inlet traps by the back-pressure of sewer-gas, the method of providing a constantly-increasing hydrostatic pressure to oppose or balance the back-pressure of the gas in the sewer, which consists of conducting into the trap a flow of water from a constant source of supply, substantially as set forth.

3. The combination, with inlet B, having trap $b$, of the pipe D, leading to a source of constant water-supply, substantially as and for the purpose set forth.

4. The combination, with inlet B, having partition-trap $b$ and screen F, the pipe D, leading to a source of constant water-supply, substantially as and for the purpose set forth.

In testimony whereof we affix our signatures in presence of two witnesses.

EDWARD Z. COLLINGS.
CHARLES F. PIKE.

Witnesses:
S. J. VAN STAVOREN,
CHAS. F. VAN HORN.